(12) United States Patent
Chou

(10) Patent No.: US 6,532,393 B1
(45) Date of Patent: Mar. 11, 2003

(54) KEYPAD STRUCTURE

(75) Inventor: Chin-Wen Chou, Taipei (TW)

(73) Assignee: Shin Jiuh Corp., Taipei Hsien (TW)

( * ) Notice: Subject to any disclaimer, the term of this patent is extended or adjusted under 35 U.S.C. 154(b) by 121 days.

(21) Appl. No.: 09/652,884

(22) Filed: Aug. 31, 2000

(51) Int. Cl.$^7$ ................................................. G05B 15/00

(52) U.S. Cl. ....................................... 700/84; 708/142

(58) Field of Search ..................... 700/83, 84; 708/131, 708/135, 142; 710/131; 341/23

(56) References Cited

U.S. PATENT DOCUMENTS 4,853,888 A * 8/1989 Lata et al. .................. 364/900

* cited by examiner

*Primary Examiner*—Paul P. Gordon
(74) *Attorney, Agent, or Firm*—Bacon & Thomas, PLLC

(57) ABSTRACT

A keypad structure of the present invention comprising a keypad and a magnetic unit within the keypad; wherein an inserting opening of the magnetic unit extends out of the keypad. Thereby, a user inserts a magnetic disk into the magnetic unit to pass through the keypad for writing data in the magnetic disk to a computer or reading data in the computer to the magnetic disk.

2 Claims, 5 Drawing Sheets

KEYPAD STRUCTURE

BACKGROUND OF THE INVENTION

The present invention relates to a keypad structure, wherein a magnetic unit is added to a keypad. Thereby, the servo or industrial computer may write data into a computer from a disk or vice versa.

Currently, offices or plants use servo mainframes or industrial computers as control centers so as to get a control with only a few labors The hardware in the current servo mainframes or industrial computers includes optic disk drives, other than mother boards, various interface cards, hard disk drives. Thereby, the user may store software into the hub disk drive in the servo mainframe or the industrial computer. Another, as a hardware interface is necessary to be expanded, the driving software of this hardware interface can be stored into the servo mainframe or industrial computer through the optic disk drive. Therefore, the user may get desired software from the hardware drive or driving software for driving a hardware interface.

However, since some software or driving software of a hardware only occupy a small volume so as to be stored in several magnetic disks having a small volume instead of being stored in an optic disk. If the servo mainframe or industrial computer is not installed with floppy disk drive, then it can not read the software or driving software from the magnetic disks. Therefore, another computer is used to be connected to the servo mainframe or industrial computer for inputting data, or the servo mainframe or industrial computer is detached for being further installed with an flopping disk drive for reading data in the magnetic disks.

Therefore, it is not economic and time-consuming. Furthermore, the virus in another computer is possible to be transferred, into the servo mainframe or the industrial computer so that the servo mainframe or the industrial computer can not be operated normally.

SUMMARY OF THE INVENTION

Accordingly, the primary object of the present invention is to provide a keypad structure, wherein a magnetic unit is added to a keypad. Thereby, the servo or industrial computer may write data into a computer from a disk or vice versa.

Another object of the present invention is to provide a keypad structure, wherein a password must be inputted for actuating the magnetic unit in order to prevent data from losing or being stolen.

Another object of the present invention is to provide a keypad structure, wherein the time required to store data from a disk to a servo or an industrial computer can be saved.

In order to achieve aforesaid objects, the present invention provides a keypad structure comprising a keypad and a magnetic unit within the keypad; wherein an inserting opening of the magnetic unit extends out of the keypad, thereby, a user inserts an magnetic disk into the magnetic unit to pass through the keypad for writing the data in the magnetic disk to a computer or reading the data in the computer to the magnetic disk.

BRIEF DESCRIPTION OF DRAWINGS

Embodiments of the present invention will hereinafter be described, by way of example, with reference to the accompanying drawings, in which.

DETAILED DESCRIPTION OF THE PREFERRED EMBODIMENTS

Figure 1:
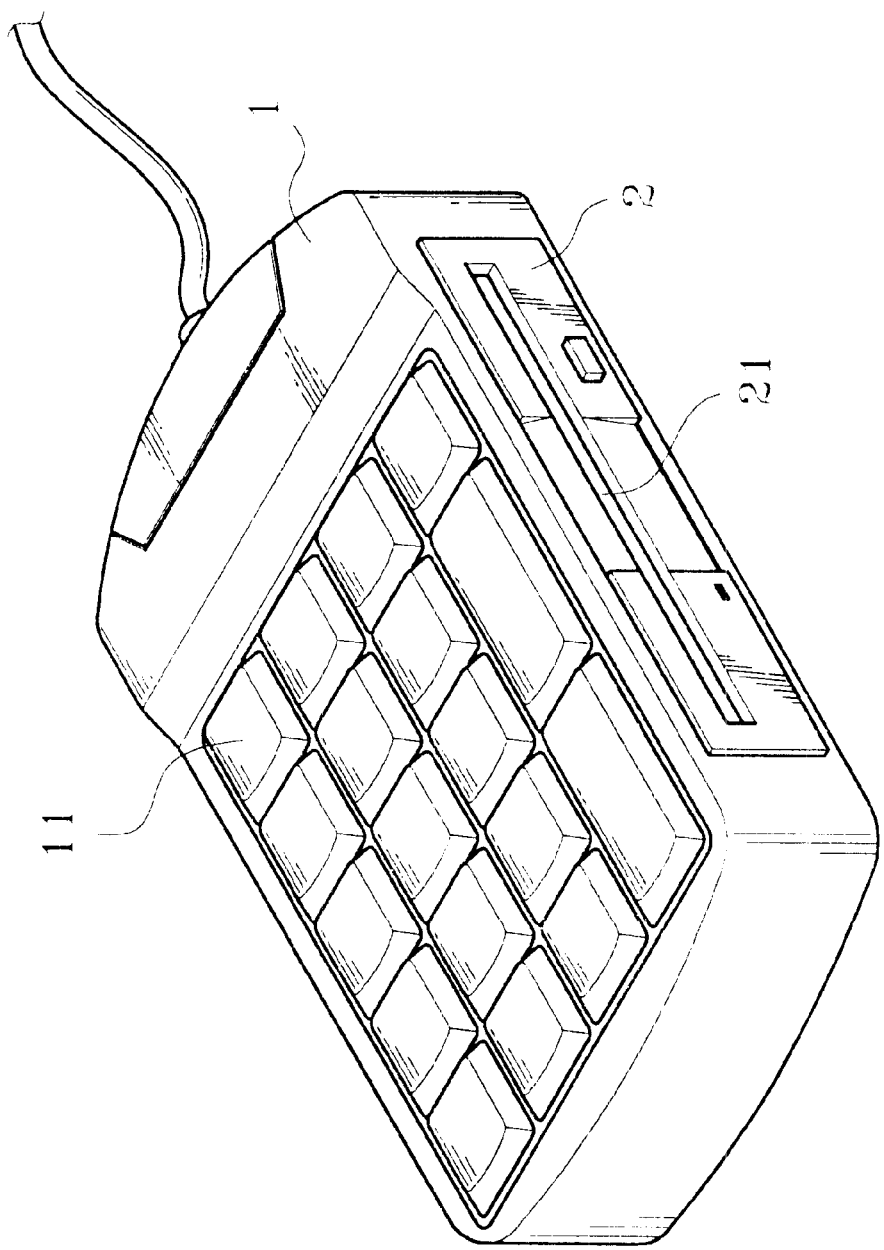
FIG. 1 is a schematic perspective view of the present invention.
Figure 2:
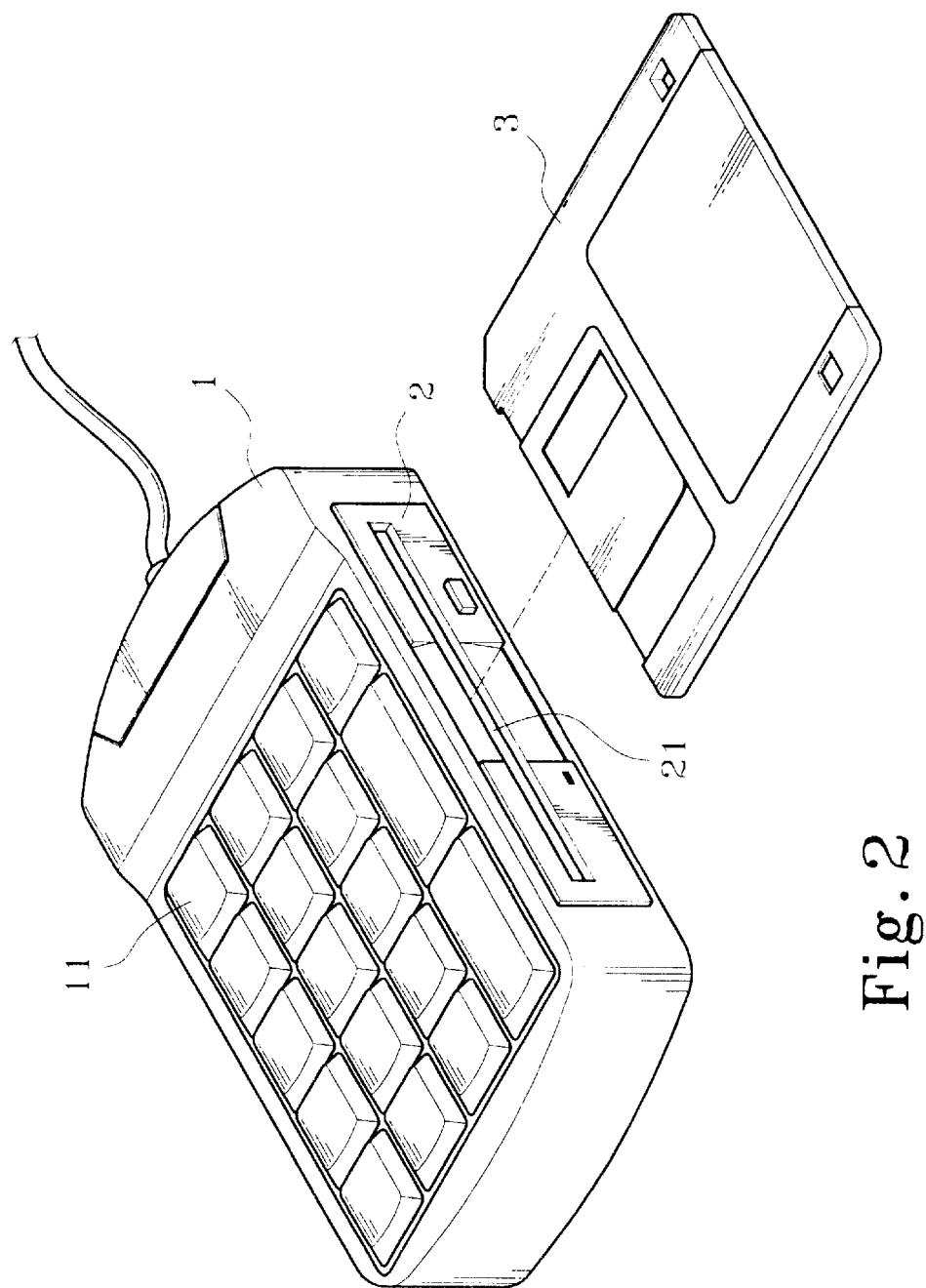
FIG. 2 is a schematic view showing the use of the present invention.

With reference to FIGS. 1 and 2, a schematic view showing a flow diagram of changing password of the present invention is illustrated. The keypad structure of the present invention includes a keypad 1 and a magnetic unit 2 within the keypad 1. The magnetic unit 2 is a floppy disk drive (or optic disk drive). The inserting opening 21 of the magnetic unit 2 extends out of the keypad 1. Thereby, a user may insert a magnetic disk 3 into the magnetic unit 2 to pass through the keypad 1 for writing the data in the magnetic disk 3 to a computer or reading the data in the computer to the magnetic disk 3. In the meantime, a password input function is installed in the keypad 1. In using, the user must input a correct password for storing the data in the computer into the magnetic disk 3 for preventing the data in computer is lost or is stolen.

Figure 3:
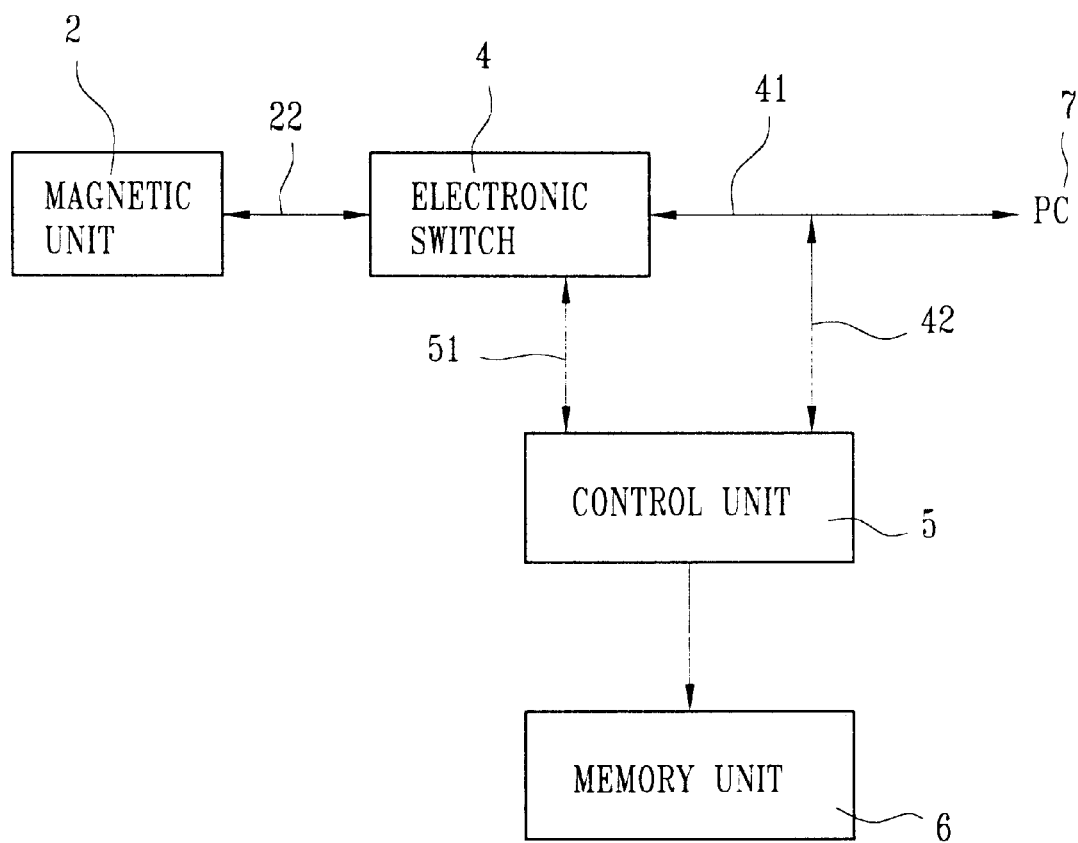
FIG. 3 is a schematic view showing the combination of the keypad and the magnetic unit of the present invention.

Referring to FIG. 3, the circuit block diagram of the keypad and disk drive of the present invention is illustrated. As shown in the figure, the keypad 1 and magnetic disk 2 are combined. The circuit is formed by an electronic switch 4, a control unit 5 of the keypad 1 and a memory unit 6. The electronic switch 4 may transfer data with the magnetic unit 2 bidirectionally through a first bus 22, and control the data flow. Another, the electronic switch 4 is connected to a PC 7 through a first universal series bus (USB) 41, and is connected to the control unit 5 of the keypad 1 through a second universal series bus 42. A second bus 51 serves to connect the control unit 5 with the electronic switch 4. By this second bus 51, the control unit 5 can control the electronic switch 4.

Furthermore, the memory unit 6 records the passwords stored by users. As a user uses the keypad, if the input password is different from the original code, the user can not actuate the magnetic unit 2 for accessing data so as to prevent the data from losing and stealing.

Figure 4:
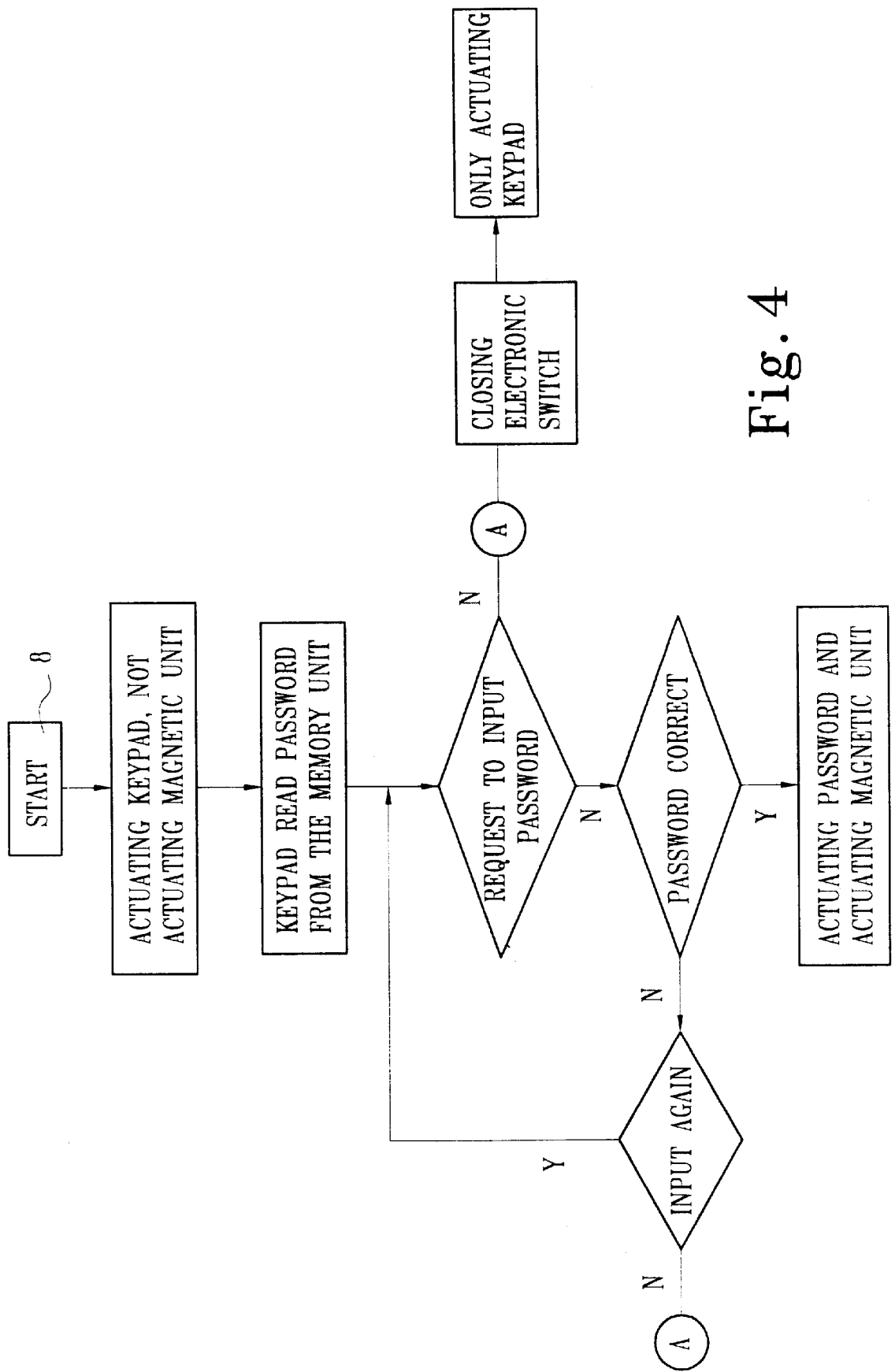
FIG. 4 is a schematic view showing the control flow diagram of the present invention.

With reference to FIGS. 3 and 4, a circuit block diagram and control flow diagram of the keypad and disk drive of the present invention are illustrated. As shown in the figures, initially, the keypad 1 actuates, while the magnetic unit 2 is not actuated, the keypad 1 reads password from the memory unit 6. Then, the keypad 1 requests the user to input a password. If the user inputs a password, which is compared by the control unit 5 and the memory unit 6. If the input password is correct, the electronic switch 4 actuates and further, the magnetic unit 2 is actuated. Thus, the user inserts the magnetic disk 3 into the magnetic unit for reading data from the PC 7 or storing the data therein. If the input password is worry, then the keypad 1 requests the user to input password against. After three times, if the input passwords are wrong the keypad 1 will be locked automatically. Namely, the magnetic unit 2 can not be opened. Only the function of the keypad 1 can be used. Therefore, the data is prevented from be stolen from the PC 7 through actuating the magnetic unit 2.

Figure 5B:
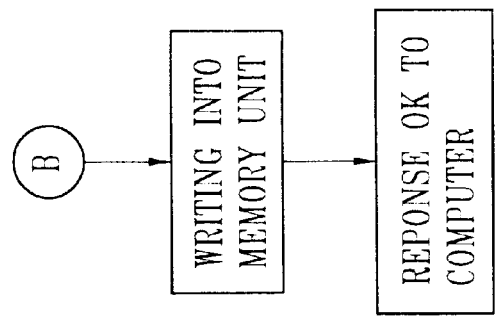
FIGS. 5A and 5B is a schematic flow diagram showing the change of the password according to the present invention.
Figure 5A:
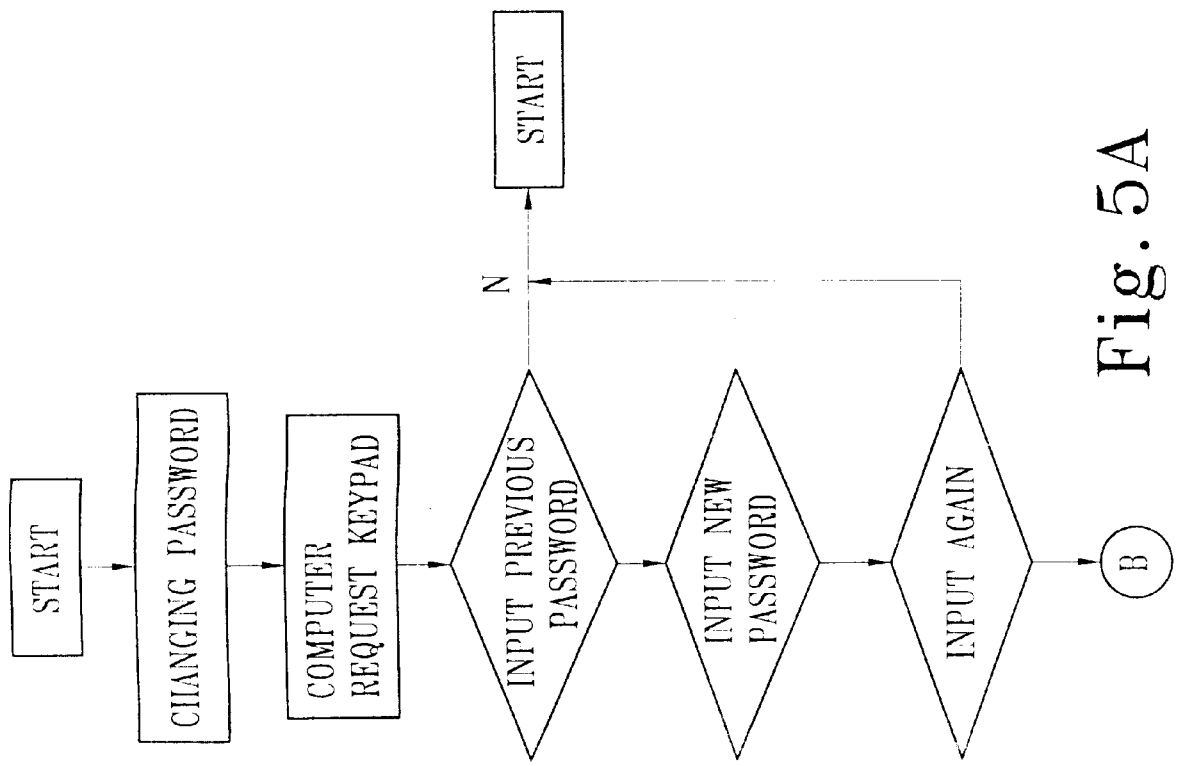

With reference to FIGS. 5A and 5B, a flow diagram of changing the passwords of the present invention are illustrated. If the password is necessary to be changed, the PC 7 requests the keypad 1 to input a password. The user inputs a previous password through the keys 11 on the keypad 1, and then inputs a new password. The PC 7 will request the user to input the new password again. Then the new password is written into the memory unit 6 through the control unit 5. Then, the control unit gives a response about the completeness of the changing password. Therefore, the procedure of the changing password is complete.

After the keypad 1 and the magnetic unit 2 are combined, for the current used servo mainframe or industrial control unit without any disk drive, the user may store the drive software, audio effect software, or other auxiliary software on a disk 3 into the servo mainframe or the industrial computer through the magnetic unit 2. Therefore, the servo mainframe or the industrial computer may use the drive software, audio effect software, or other auxiliary software as a control interface to control a hardware.

It will also be appreciated that other modifications and variations may be made to the embodiments as described and illustrated within the scope of the present application as defined in the following claims.

What is claimed is:

1. A keypad structure having a keypad and a magnetic unit, further comprising a circuit for transferring data and controlling the keypad and the magnetic unit, and for being connected to an external computer, the circuit comprising:

an electronic switch for controlling the actuation of the magnetic unit to be connected to the computer;

a memory unit for storing password; and a control unit for being connected to the computer and controlling the actuation of the electronic switch for writing a password into the memory unit;

wherein the circuit controls the magnetic unit to write the data in the magnetic unit into the computer, or stores the data in the computer into the magnetic unit, another, in assessing data, a password is required to be inputted for actuating the magnetic unit to write data into the computer or store data from the computer for preventing data from being lost or stolen.

2. The keypad structure as claimed in claim 1, wherein the electronic switch and control unit are connected to the computer through an universal series bus.

* * * * *